April 5, 1927.  1,623,067
E. G. OAKLEY
SOCKET CAP AND METHOD OF MAKING THE SAME
Filed July 21, 1922  3 Sheets-Sheet 1
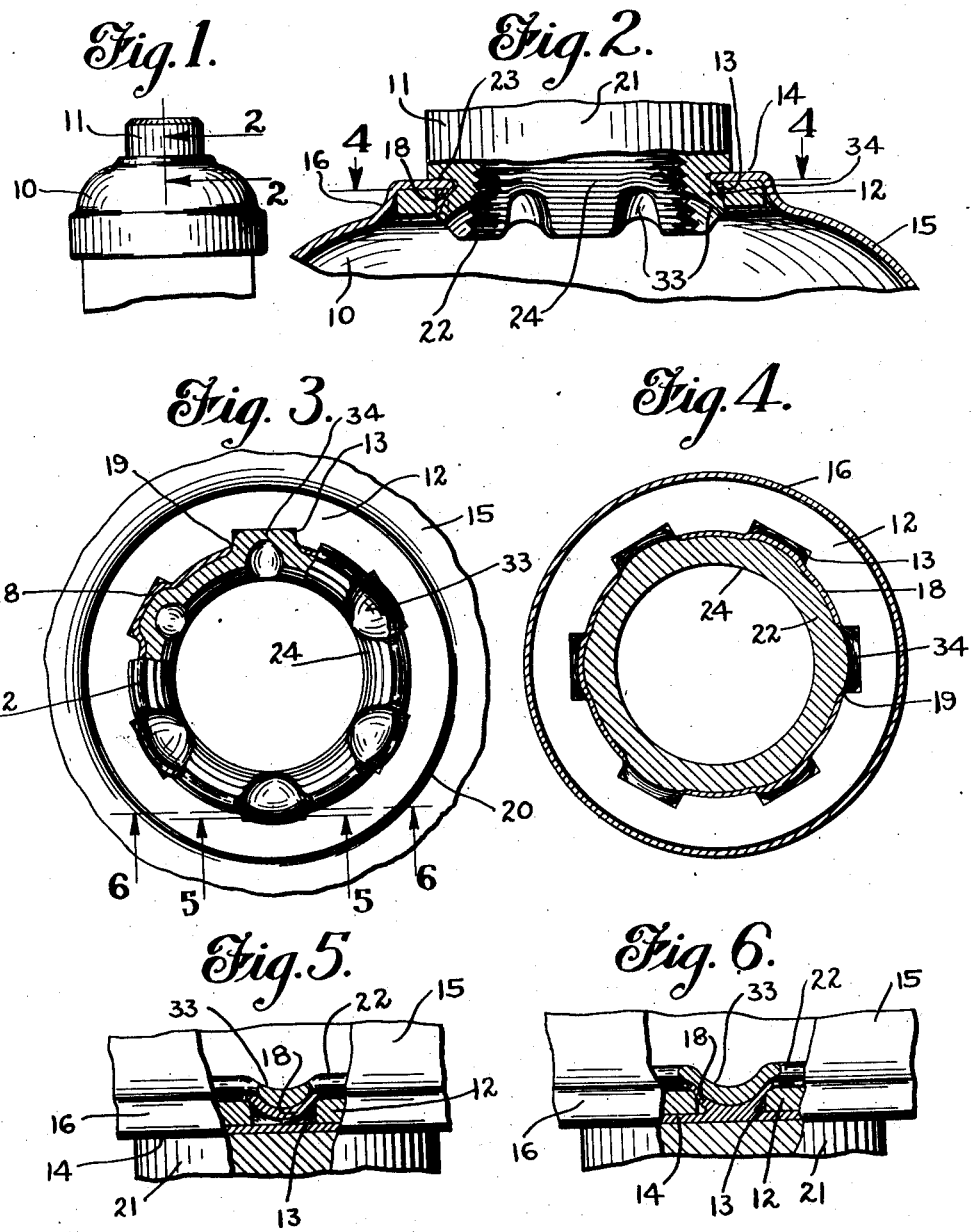
Inventor
Erastus G. Oakley
By Henry E. Rockwell
Attorney

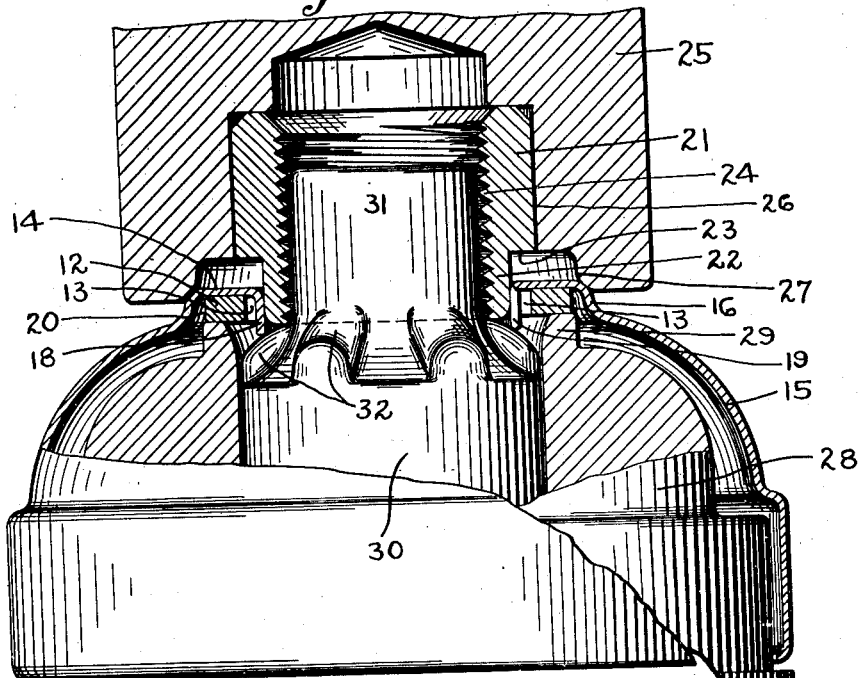
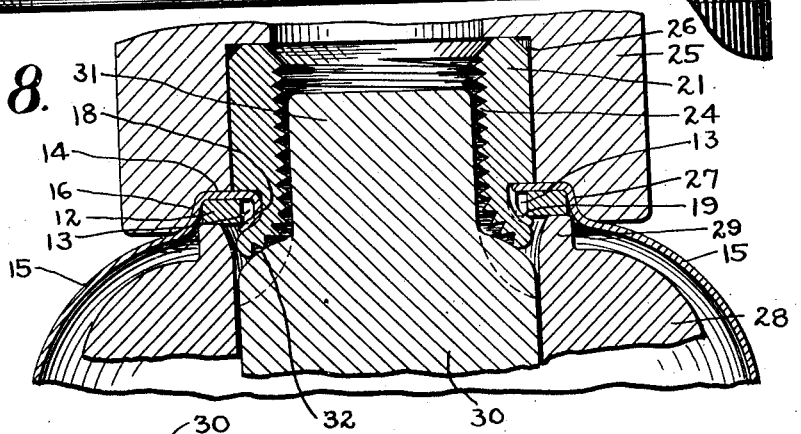
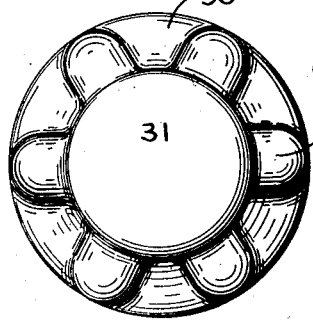

April 5, 1927.
E. G. OAKLEY
1,623,067
SOCKET CAP AND METHOD OF MAKING THE SAME
Filed July 21, 1922    3 Sheets-Sheet 3
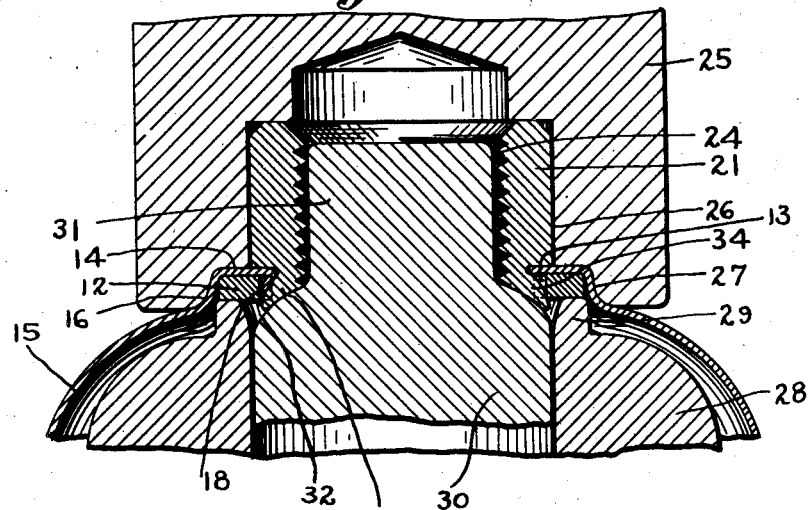
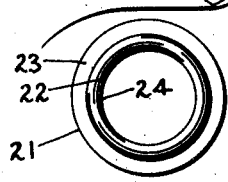
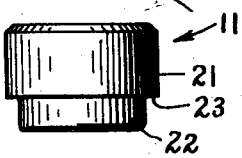
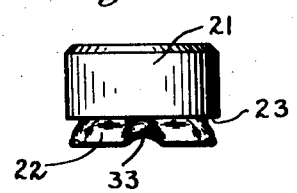
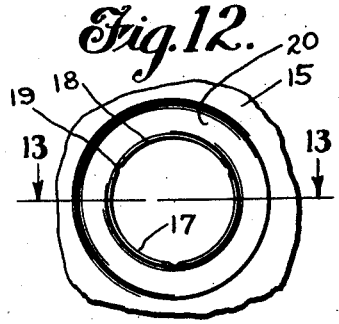
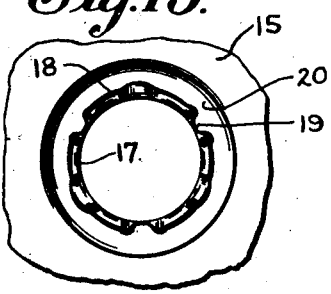
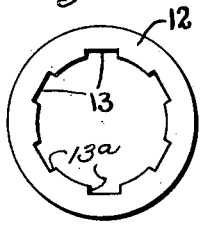
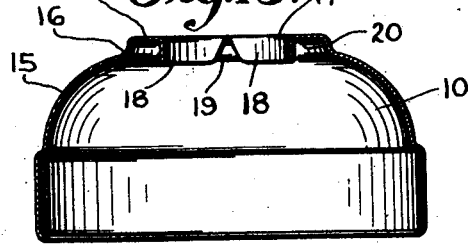
Inventor
Erastus G. Oakley
By Henry E. Rockwell
Attorney Patented Apr. 5, 1927

1,623,067

UNITED STATES PATENT OFFICE.

ERASTUS G. OAKLEY, OF SOUTHPORT, CONNECTICUT, ASSIGNOR TO BRIDGEPORT BRASS COMPANY, OF BRIDGEPORT, CONNECTICUT.

SOCKET CAP AND METHOD OF MAKING THE SAME.

Application filed July 21, 1922. Serial No. 576,490.

This invention relates to the metal caps of electric light sockets or shells. As ordinarily constructed, these caps have a shell or dome stamped up from thin sheet metal such as brass, and a thick hub or bushing which is secured to the shell or dome in a suitable manner such as by staking. The hub is usually internally screw threaded to provide means by which it may be secured to a light fixture, and during the application of a cap to a fixture the connection between the shell or body of the cap and hub is subjected to considerable strain, as in screwing the cap into position, it is usually grasped by the shell portion. Moreover, at various times while the cap is in use, the joint between the hub and shell is subjected to a similar turning stress. For these reasons, a very secure connection is necessary at this point to prevent the parts from becoming loose.

One object of my invention is to provide an improved socket of this character, the parts of which shall be firmly and securely united to withstand the greatest possible amount of strain.

Another object of my invention is to produce, in an economical and simple manner, a socket cap of this character wherein a strain resisting union of the hub and shell is effected.

Another object of my invention is to produce a socket cap wherein the metal of the shell and hub parts of the cap will be so securely and firmly interlocked that the parts will not become loose, even under excessive strain.

Another object of my invention is to provide a new and improved method of manufacture of electric light socket caps.

To these and other ends the invention consists in the novel features and combinations of parts to be hereinafter described and claimed.

In the accompanying drawings:

Fig. 1 is a side elevational view of a socket cap embodying my improvements;

Fig. 2 is an enlarged sectional view on line 2—2 of Fig. 1;

Fig. 3 is an enlarged view of the interior of the socket cap, a part thereof being shown in section;

Fig. 4 is a sectional view on line 4—4 of Fig. 2;

Figs. 5 and 6 are detail sectional views on lines 5—5 and 6—6, respectively, of Fig. 3;

Fig. 7 is an enlarged view, partly in section, of the socket cap during the process of manufacture;

Fig. 8 is a view similar to Fig. 7, showing another step in the manufacture of the cap;

Fig. 9 is an enlarged sectional view, showing the parts of the cap as they stand at the completion of the assembly thereof;

Fig. 10 is a top plan view of the die punch used in uniting the parts of the cap;

Fig. 11 consists of a bottom and a side view of the hub prior to the assembly of the parts;

Fig. 12 is a fragmentary bottom view of the shell;

Fig. 13 is a section on line 13—13 of Fig. 12;

Fig. 14 is a side elevational view of the hub as it would appear after the parts have been joined together;

Fig. 15 is a view similar to Fig. 12, but showing the shell as it would appear after the joining of the parts in the die; and Fig. 16 is a plan view of the notched washer.

My improved cap consists of a dome shaped shell or body portion 10, a relatively thick hub portion 11 and a ring or washer 12 provided upon its inner edge with a plurality of notches 13, the notches having sharply defined end faces 13ª forming shoulders projecting substantially radially of the washer.

The body 10 is provided with a substantially flat annular portion 14 at the top, which joins or merges into the dome shaped part 15 of the shell by an annular shoulder 16 which in the finished cap extends substantially at right angles to the flat portion 14. The top of the cap or the shell is provided with an opening 17 extending axially of the shell portion and about this opening the metal of the shell is turned axially thereof to provide a bordering flange. This border, however, does not consist of a circular flange extending entirely about the opening, but preferably comprises a plurality of arcuate flanges 18 separated by the notches 19. The flanges are, however, formed integrally with the metal of the shell. It will be apparent that a substantially annular recess 20 is provided between the shoulder 16 and the flanges 18, the purpose of which will be more fully explained hereinafter.

The hub may, if desired, be a screw machine product cut from a solid rod and is preferably thicker than the sheet metal shell. It consists, in this instance, of a body portion 21 having a depending flange 22 at the lower end thereof, the flange being separated from the body by the shoulder 23. This hub is provided with the threads 24 upon the interior thereof so that it may be suitably connected to a light fixture.

The washer 12 may be made in any manner desired, it consisting of a relatively thin annulus or ring having a smooth outer edge and provided upon its inner edge with the notches 13.

The parts above described are assembled by placing the washer 12 within the recess 20, inserting the flange 22 of the hub within the opening 17 of the shell and joining the parts by pressing the flanges of the hub and shell both outwardly and upwardly into interlocking engagement with each other at spaced points. In the present instance, where a notched washer or ring 12 is used, these parts of the flanges of the shell and hub which are displaced will be pressed into the notches of the washer to gain a firmer connection. In some prior constructions, the shell and hub have been united by a lateral or outward displacement of the metal of these two parts, but in such case the interlocking connection is not effective, nor capable of resisting so great a strain as when the metal is displaced both outwardly and upwardly, and particularly the latter, when as in the present instance, a notched washer is used, for it is the upward displacement of the metal that tends to more completely fill these notches with the displaced metal.

In assembling the parts of the cap, I employ a die 25 having a matrix 26 to receive the body portion of the hub and a shouldered opening or mouth 27 to receive the shoulder 16 of the shell and press it firmly against the ring 12 during the staking or uniting operation. Within the cap is placed a holder or stripper 28 which generally conforms to the shape of the shell and is provided with the upwardly projecting annular rib 29 to support the ring 12 from the lower face thereof. Within this stripper is the punch 30 provided with a somewhat diminished upper end or pilot 31 adapted to enter the hub and locate the parts relatively to the staking tools. Below this portion the punch is enlarged and upon this enlargement are provided a plurality of somewhat dome shaped bosses or projections 32 which, as will be more fully described hereinafter, serve to press the metal of the flanges of the hub shell upwardly and outwardly to form dome shaped impressions therein and to cause the metal of these flanges to enter and substantially fill the notches 13 of the ring.

While either the die or the punch may be made the movable member in the staking operation, I prefer to mount the punch rigidly and to move the die downwardly thereupon. It also is preferable to arrange for limited movement between the stripper and punch and, if desired, the stripper may be spring supported so that it will be urged in an upward direction as shown in Figs. 7 and 9.

When the parts of the cap have been blanked out and formed as described above, ready to be assembled, they are placed in position to be joined, as shown in Fig. 7, with the notched washer within the recess of the shell and the flange upon the lower portion of the hub within the shell opening. In this position, the washer and shell are supported by the stripper. The die is now brought down over the hub and during a continuance of the operation over the shoulder 16 upon the shell. During an initial part of the operation as shown in Fig. 8, the die has been brought down to force the flange 22 of the cap outwardly upon the enlarged portion of the punch. The projections 32 upon this part of the punch will then displace the metal of the flange upwardly into the notches of the washer. As shown in this figure, the portion 27 of the die impresses the shoulder 16 upon the shell to positively form the shoulder closely about the outer edge of the washer and act as a backing for the washer to resist the outward pressure exerted by the punch projections 32 on the parts of the cap.

Upon a continuance of the stroke of the press, the die will be brought down still farther toward the punch and the projections 32 upon the latter will force the metal of both the shell flange and the hub flange upwardly so as to substantially fill the notches of the washer, as shown in Fig. 9. That is to say, while the first part of the operation, shown in Fig. 8, mainly serves to spread the hub flange, a continuance of the stroke serves to upset it into the notch of the washer and to make an impression or dent in both the hub flange and the shell flange and creates a bulge upon the outer surfaces of these members, which fills a large portion of the corresponding notch in the washer. While the first part of the stroke of the press produces for the most part, a lateral or spreading movement of the hub flange, it will be seen that the latter part of the movement produces the upward displacement of the flanges.

During the latter part of the movement of the tools, the threads upon the inner surface of the hub flange will be pressed out as shown at 33 in Fig. 9.

It will be apparent that the flared or enlarged mouth portion 27 of the die will be brought down to embrace the shoulder 16 upon the shell serving not only to support it and the washer from outward displacement before any great force in that direction is exerted upon these parts, but also pressing the material of the shoulder firmly and closely against the periphery of the washer. The result is that not only are the shell and hub flanges pressed intimately into the notches of the washer, but also the washer is prevented from being deformed, and the shoulder portion of the shell held closely against the outer edge thereof.

In case the notches 19 which separate the flanges of the shell register with the notches 13 of the ring, the result will be that the metal of the hub flange will be pressed outwardly into and through these notches beyond the edges thereof, as shown at 34 in Fig. 9, whereby a very effective interlocking of the flanges and shell is produced and the metal of the hub is, of course, pressed still farther into the notches of the washer than would be the case were it not forced through these openings between the arcuate flanges. While an intimate and secure connection is made without causing the notches 19 of the shell to register with the notches 13 of the washer, I usually provide three of the notched openings about the flanges of the shell so that they may be made to register with alternate notches of the washers, if desired.

While I have shown and described a preferred embodiment of my invention and a preferred method of carrying out my improved process, it will be apparent that they are not to be limited to all the details shown or to the exact steps described, but are capable of modification and variation within the spirit of the invention and within the scope of the appended claims.

What I claim is:

1. A socket cap shell having an opening and a flange extending axially of the opening, a washer encircling the flange and provided upon its inner periphery with notches having shoulders at each end thereof and a flanged hub having the flange thereof inserted into the opening, the cap flange and hub flange being pressed outwardly and upwardly into the notches of the washer between the shoulders to effect an interlocking engagement of the parts.

2. A socket cap shell having an opening and a flange extending axially of the opening, a washer encircling the flange and provided upon its inner periphery with notches having end shoulders, and a flanged hub having the flange thereof inserted into the opening, the cap flange and hub flange being pressed outwardly and upwardly into the notches of the washer, the pressed out portion of the hub flange being upset to substantially fill the notches.

3. A socket cap shell having an opening and a flange extending axially of the opening, a washer encircling the flange and provided with notches, each having end faces making sharp angles with the rear edge of the notch, and a flanged hub having the flange thereof inserted into the opening, the hub flange being staked out at certain points for upsetting such portions into the notches of the washer.

4. The method of making a socket cap which comprises forming the cap body with an opening and an axially extending flange, inserting within the opening the flange of a flanged hub member, placing back of the body flange a washer having on its inner periphery notches with sharply defined end faces forming shoulders and displacing the metal of the flanges upwardly and outwardly into the notches to form an intimate connection between the parts.

5. The method of making a socket cap which comprises forming the cap body with an opening and an axially extending flange, inserting within the opening the flange of a flanged hub member, placing back of the body flange a washer having on its inner periphery notches with sharply defined end faces forming shoulders and displacing the metal of the flanges upwardly and outwardly into the notches to form an intimate connection between the parts, the displaced portions of the hub flange being upset to substantially fill the notches.

In witness whereof, I have hereunto set my hand on the 13 day of July, 1922.

ERASTUS G. OAKLEY.